May 21, 1940. W. R. GRISWOLD 2,201,169
CHANGE-SPEED GEARING
Filed Feb. 2, 1937 4 Sheets-Sheet 1

Inventor.
Walter R. Griswold,
Watson, Cole, Grindle
By & Grindle
Attorney

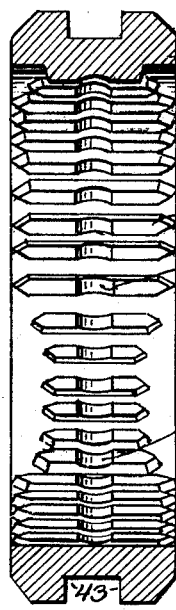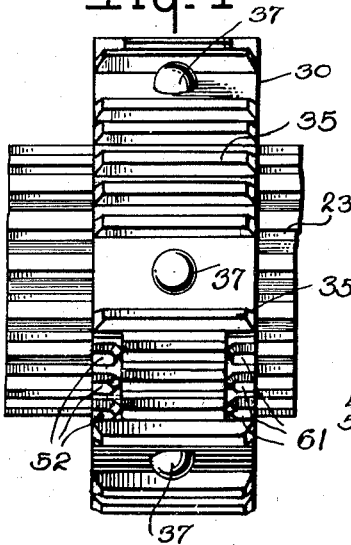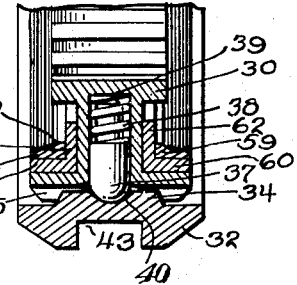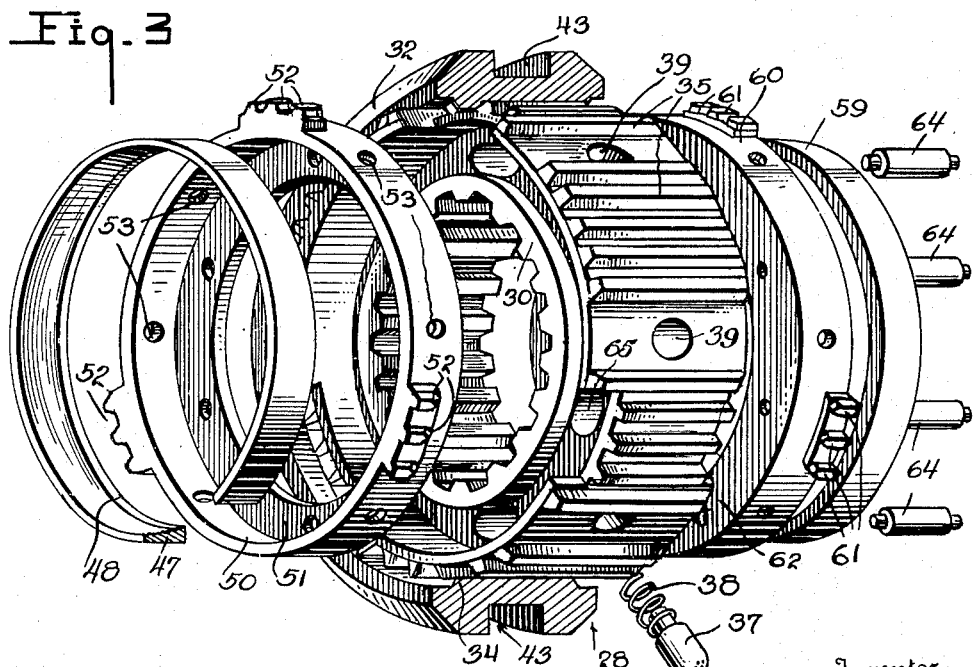

May 21, 1940.    W. R. GRISWOLD    2,201,169
CHANGE-SPEED GEARING
Filed Feb. 2, 1937    4 Sheets-Sheet 3
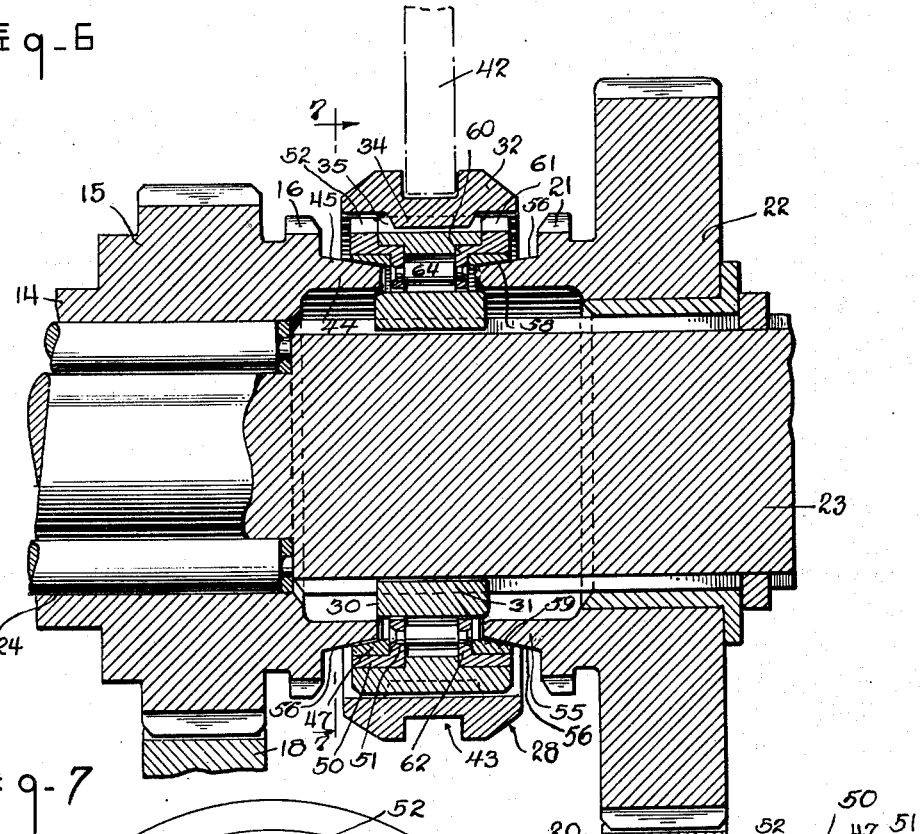
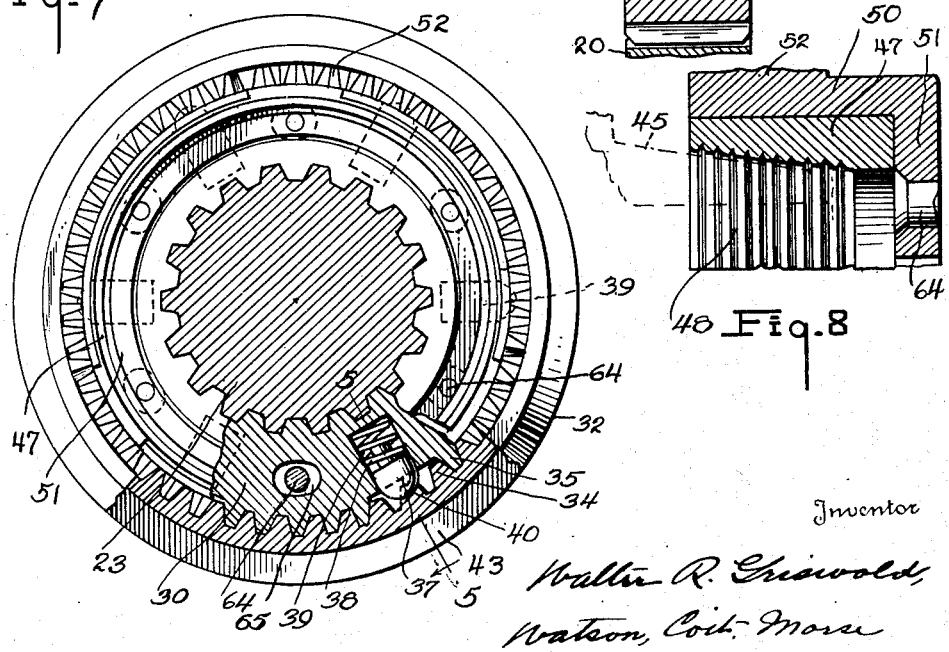

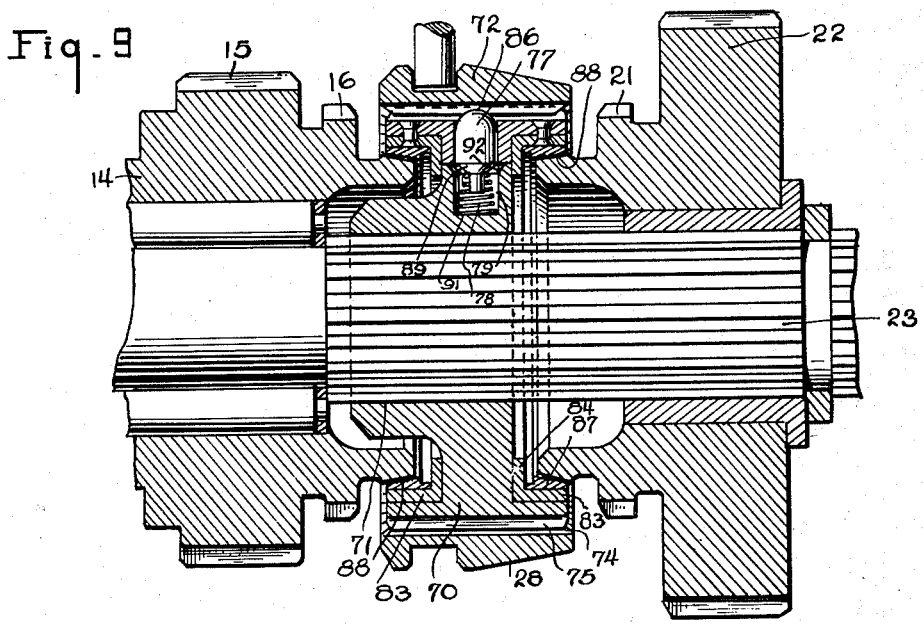
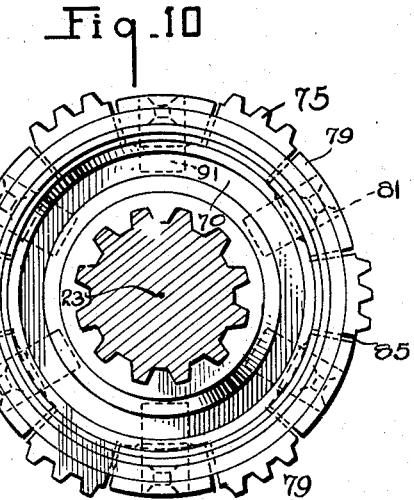
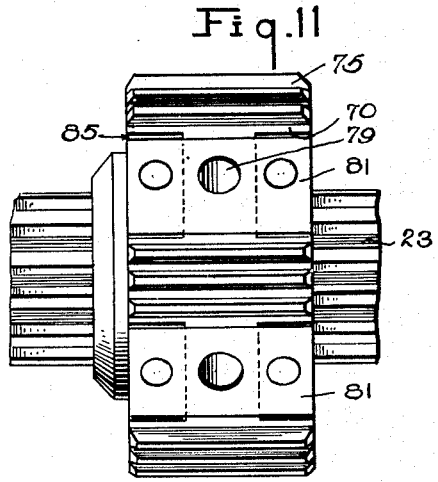
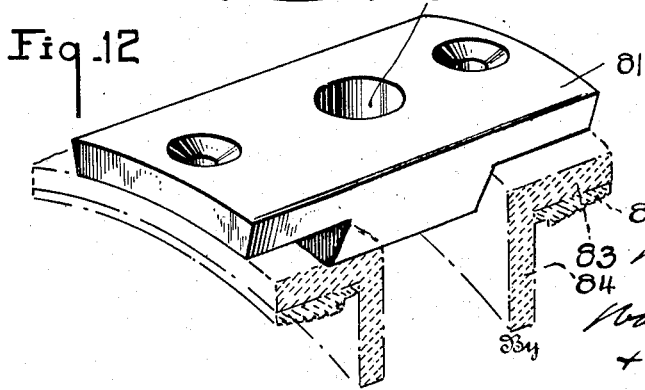

Patented May 21, 1940

2,201,169

UNITED STATES PATENT OFFICE 2,201,169

CHANGE-SPEED GEARING

Walter R. Griswold, Detroit, Mich., assignor to Packard Motor Car Company, Detroit, Mich., a corporation of Michigan Application February 2, 1937, Serial No. 123,681

6 Claims. (Cl. 192—53)

This invention relates to change-speed gearing and is particularly concerned with improvements in variable speed transmission gearing for motor vehicles.

In the operation of motor vehicles, it is requisite to smooth gear changing that the gears or positive clutch elements which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts, it is now common practice to synchronize the gears or toothed clutch elements to be meshed by various means, for example friction clutches, the latter being engaged immediately prior to the meshing of the two rotating elements for the purpose of bringing them to the same rotational (or peripheral) speed. However, by reason of inexperience or undue haste the driver frequently effects meshing of the cooperating elements without permitting sufficient time to elapse to enable the elements to acquire the same speed, and as a result the elements clash and are thus subject to excessive wear or premature breakage.

It is therefore one of the principal objects of the invention to provide means for synchronizing toothed elements prior to the meshing thereof which is so constructed as to ensure reasonably satisfactory synchronization before the elements are actually brought into meshing engagement. To accomplish this purpose the invention contemplates either positive retention of the elements in non-meshing relationship until the correct relative speeds of rotation are established or yielding opposition to the relative movement of the elements toward intermeshing position such as to render difficult the meshing of the elements prior to the establishment of proper relative speeds.

More specifically it is an object of the invention to provide, in a transmission gearing for motor vehicles, a device for synchronizing an intermediate element with either of two cooperating elements which are arranged for selective meshing engagement by the first element, and a device which is caused to assume, during lack of proper synchronization, a position in which relative movement of the elements to intermeshing position is retarded, opposed, or prevented and which may assume, when proper synchronization has been established, a second position in which fairly free movement of the elements to intermeshing relation is permitted.

A further object of the invention is to provide a motor vehicle transmission having an improved device for synchronizing the toothed elements in the gear train, which device is simple and effective, reliable in operation, and which will act to minimize the possibility of clashing of the toothed elements or of the selecting devices therefor during selection of a desired speed ratio.

Further objects and features of the invention will be apparent from the following description, taken in connection with the accompanying drawings in which—

Figure 2 is an exploded perspective view, partly in section, of the synchronizing device shown in Figure 1;

Figure 3 is a sectional view on the diameter of one of the rotating elements shown in Figure 2;

Figure 4 is a side elevation of another of the elements shown in Figure 2, illustrated in position on its supporting shaft;

Figure 5 is a fragmentary sectional view taken substantially on the line 5—5 of Figure 7;

Figure 6 is a vertical sectional view through certain toothed elements and the synchronizing device shown in Figure 1;

Figure 7 is a sectional view taken substantially on the line 7—7 of Figure 6;

Figure 8 is a fragmentary sectional view, substantially enlarged, of a detail shown in Figure 6;

Figure 9 is a vertical sectional view of a modified form of synchronizing device and associated toothed elements;

Figures 10 and 11 are end and side elevations respectively of the synchronizing device shown in Figure 9, the outer element being omitted;

Figure 12 is a fragmentary perspective view of one of the elements of the device shown in Figure 10.

Figures 1, 13:
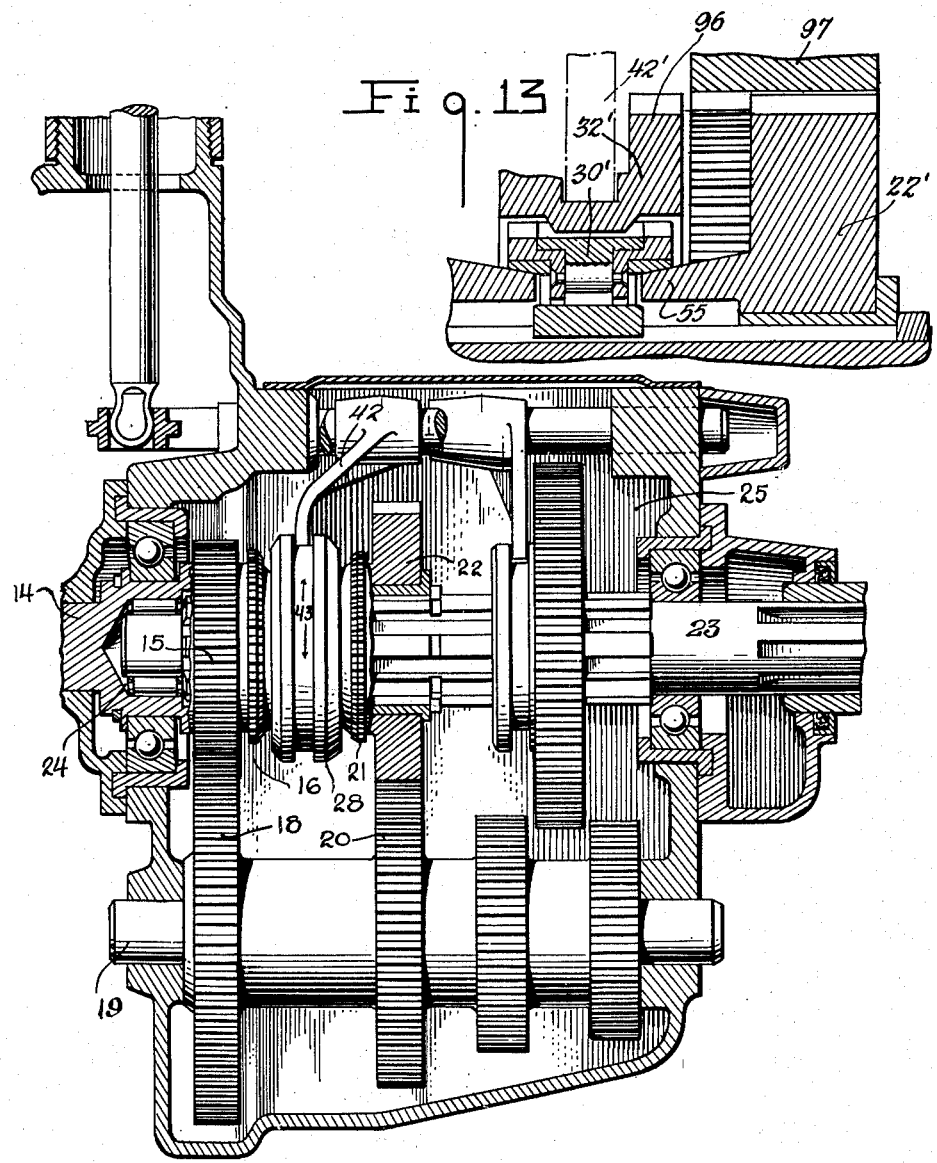
Figure 1 is a longitudinal vertical sectional view through a motor vehicle transmission to which the invention may be readily applied.
Figure 13 is a fragmentary vertical sectional view corresponding to Figure 6 but illustrating a slightly modified form of construction.

For convenience in illustrating the invention, reference is made to the accompanying drawings and specific language is employed to describe the same. It will nevertheless be appreciated that various modifications and alterations of the devices illustrated would readily occur to one skilled in the art and that no limitation of the invention is intended by the use of detailed language. It will also be apparent that many of the features of the invention may be used either separately or conjointly and are applicable to other mechanisms than the transmission gearing in connection with which they are illustrated herein. Thus the gearing selected for illustration is of the so-called slidable key type in which cooperating toothed elements having internal and external teeth respectively are meshed or clutched together, but it will be noted that the synchronizing device described herein may be employed in transmissions of the slidable gear type in which two externally toothed elements are brought into meshing engagement while rotating at substantially the same linear speed. Again, while the synchronizing device shown herein is particularly adapted for the selective coupling of either of two adjacent toothed elements to a shaft, the device may be employed to connect only one element to a shaft or to bring only two gears into meshing relation.

For convenience, mention is made herein of the synchronization and of the synchronous movement of two rotating elements. It will be appreciated that by synchronous rotation of coaxial toothed elements or clutches, reference is made to rotation of such elements at the same angular speed; as applied to externally toothed intermeshing elements or gears, or to a pair of cooperating externally and internally toothed elements of different diameter, synchronous rotation is such relative rotation as will give the same linear speed of the cooperating toothed portions of the two elements.

The transmission mechanism selected for the purpose of illustrating the invention is similar in all essential details to that shown in the prior patent to Vincent 1,901,713, granted March 14, 1933, but the invention is of course not restricted to use with such mechanism. The gearing train is more or less conventional and includes a driving shaft 14 and a driving gear 15 having a toothed clutch portion 16 formed integrally therewith, gear 15 meshing with a gear 18 on an idler shaft 19. A second gear 20, mounted on the idler shaft and rotating with the gear 18, meshes with a gear 22, which is provided with a toothed clutch portion 21. The gear 22 is freely rotatable on a driven shaft 23, which is in turn journalled as indicated at 24 within the gear 15 and driving shaft 14. The shafts 14 and 23 are journalled in and at opposite ends of the transmission housing 25 and are thereby supported in coaxial relation. Additional gears for securing further speeds are also illustrated in the drawings, but are unnecessary to an understanding of the instant invention.

A synchronizing device indicated generally at 28, is carried on the driven shaft 23 intermediate the clutch elements 16 and 21 and is so constructed as to be capable of selectively coupling either the gear 15 or the gear 22 to the driven shaft 23, whereby the driven shaft 23 may be rotated either at the speed of rotation of the driving shaft 14, by direct coupling of the gear 15 and shaft 14 thereto, or at a reduced speed through the idler shaft 19 and gears 18 and 20, by coupling of the gear 22 thereto. This type of transmission mechanism is now wholly conventional and the details thereof form no part of the instant invention.

The synchronizing device 28 is illustrated more particularly in Figures 2 to 8 inclusive and preferably includes two primary parts, an annular element 30 which is splined as indicated at 31 to the driven shaft 23 and an annular element 32 which is in turn splined to the element 30. The splined connection between the elements 30 and 32 comprises internal teeth 34 on the latter and external teeth 35 on the former, the teeth 34 being also adapted for selective meshing relation with the teeth of the clutch portions 16 and 21 of the adjacent gears 15 and 22. A plurality of detents 37, urged radially outward by coil springs 38, are received in recesses 39 in the peripheral portion of the element 30 and are arranged to engage in relatively shallow pockets 40 formed in the teeth 34 and disposed substantially in the median plane of the element 32. When the detents are thus seated, it will be appreciated that the elements 30 and 32 are yieldingly locked against relative axial displacement. Thus when the element 32 is displaced to either the right or the left from the position in which it is shown in Figure 6 of the drawings, for instance by means of a conventional shifter fork 42 engaging an annular groove 43 in the periphery of the element 32, the element 30 will tend to move axially therewith on the shaft 23 to engage and render operative either of two synchronizing clutches which are hereinafter more particularly described. Continued movement of the element 32, however, will tend to force the detents 37 out of the shallow pockets 40 in the element 32 against the action of the coil springs 38, and the element 32 will slide axially on the element 30 to engage either the clutch portion 16 of the gear 15 or the clutch portion 21 of the gear 22, depending on the direction of axial displacement, whereby either the gear 15 or the gear 22 will be positively clutched to the driven shaft 23.

The cooperating members of the synchronizing clutch acting between the gear 15 and the element 30 are preferably of the frictional type and may comprise a laterally directed annulus 44 formed integrally with the gear 15 and provided with an external conical clutch surface 45, and an annular member 47 carried by the element 30 and having a complementary internal conical surface 48 for engagement therewith. The surface 48 of the annular member 47 may be scored or grooved internally as indicated more particularly in Figure 8, and is secured, for example by shrinking, within an annular element 50, the latter having an inwardly directed radial flange 51 and a plurality of circumferentially spaced, outwardly directed segments formed with teeth 52. To further ensure rigid connection between the member 47 and the element 50, the latter may be provided with a plurality of circumferentially spaced apertures 53 into which the member 47 may be pressed.

Similarly the gear 22 is provided with a laterally directed annulus 55 which is formed to provide a conical clutch surface 56 which may cooperate with the complementary clutch surface 58 formed on an annular element 59, the latter being shrunk within an annular element 60 which is formed to provide a plurality of circumferentially spaced, outwardly directed segments having teeth 61, and an annular inwardly directed radial flange 62. The flanges 51 and 62 of the annular elements 50 and 60 are rigidly secured in spaced relation and in position at either side of the element 30 by means of a plurality of pins 64, the central portion of each pin, which is of larger diameter than the end portions thereof, being of such length as to space the elements 50 and 60 to an extent sufficient to permit slight rotative movement thereof as a unit with respect to the element 30. The pins 64 extend through circumferentially spaced apertures 65 in the element 30, these apertures being of larger diameter than the pins to permit the slight relative rotative movement of the elements 30 and 50 hereinbefore referred to.

It will be observed that certain of the teeth 34 on the element 32 and of the teeth 35 on the element 30 are of shorter length than the remainder and from Figure 2 of the drawings it will be noted that the circumferentially spaced teeth 52 and 61 of the annular elements 50 and 60 are positioned so as to lie adjacent to these shorter teeth 34 and 35. When the teeth 52 and 61 are positioned in alignment with the adjacent teeth 35, the element 32 is slidable freely on the element 30 in either direction from the neutral position in which it is shown in Figure 6 into cooperative engagement with either of the toothed clutch portions 16 and 21 of the gears 15 and 22. When, however, as the result of slight rotation of the elements 50 and 60 in either direction, the teeth 52 and 61 are out of alignment with the adjacent teeth 35, the teeth 34 on the annular element 32 will abut the teeth 52 and 61 to prevent axial displacement of the element 32 on the element 30 from the neutral position in which it is shown in Figure 6.

The operation of the device will now be apparent. Assuming that it is desired to couple the gear 15 to the shaft 23, the shifter fork 42 is displaced toward the left from the position shown in Figures 1 and 6, for example, by manipulation of the conventional gear shift lever 41, and the element 32 is displaced toward the left, carrying therewith the element 30 by reason of the action of the spring pressed detents 37, thus engaging the cooperating friction clutch surfaces 45 and 48. The engagement of these surfaces not only tends to establish the same speed of rotation in the element 30 and the gear 15, but serves also to rotate the elements 50 and 60 with respect to the element 30 so that the teeth 52 are displaced from alignment with the adjacent teeth 35 on the periphery of the element 30. Thus when the ends of the teeth 34 engage the adjacent ends of the teeth 52, the element 32 can be displaced no further to the left, except by the use of excessive force, and the operator is compelled to delay the completion of the shifting operation until the element 30 and the gear 15 are rotating at the same or substantially the same speed. He will then be able to further displace the element 32 toward the left, the elements 50 and 60 being rotated slightly by the camming action of the teeth 34 on the teeth 52 which results in re-establishment of the alignment of the teeth 52 with the adjacent teeth 35, the cooperating ends of the teeth 34 and 52 being pointed to facilitate this action and also chamfered. When this alignment is accomplished, the element 32 may be freely moved to the left into cooperative clutching engagement with the toothed portion 16 of the gear 15.

The construction is of course duplicated at the opposite side of the elements 30 and 32 so that on displacement of the element 32 to the right, the operator is compelled to delay the completion of the shifting movement until the elements to be coupled have been properly or at least substantially synchronized.

By varying the angle of chamfer on the cooperating ends of the teeth 34 on the element 32 and the teeth 52 and 61, the shifting of the element 32 into positive clutching position with either of the clutch portions 16 or 21, may be rendered either more or less difficult, but in any event it will be appreciated that positive clutching can be effected, prior to the complete synchronization of the cooperating clutch elements, only by the application of sufficient force to overcome the torque applied to the element 30 by the synchronizing friction clutch.

Referring now to the form of the invention shown in Figures 9 to 12 inclusive of the drawings, in which elements similar to those hereinbefore referred to are designated by similar reference numerals, it will be observed that the gears 20 15 and 22 may be selectively clutched to the shaft 23 by the operation of an intermediate synchronizing device indicated generally at 28. This synchronizing device comprises an annular element 70, which is splined as indicated at 71 to the driven shaft 23 and an annular element 72 which is in turn splined to the element 70. The splined connection between the elements 70 and 72 comprises internal teeth 74 on the latter and external teeth 75 on the former, the teeth 74 being also adapted for selective meshing relation with the teeth of the clutch portions 16 and 21 of the adjacent gears 15 and 22. A plurality of detents 77, urged radially outward by coil springs 78, are received in recesses 79 in segmental elements 81 which are supported in the peripheral portion of the element 70 for slight circumferential displacement with respect thereto. Thus the segmental elements may be secured, as shown in detail in Figure 12, to annular elements 83, the latter being provided with inwardly directed radial flanges 84 which engage the lateral faces of the element 70, sufficient clearance being provided to permit the necessary relative circumferential displacement of the annular elements 83, which together with the segmental elements 81 form a unitary structure, and the element 70. It will be observed that the teeth 75 on the element 70 are arranged in groups which are circumferentially spaced about the periphery of the element, the latter being recessed as indicated at 85 intermediate these groups of teeth to receive the segmental elements 81. The extent of relative circumferential movement of the elements 70 and 83 is thus determined by the clearance between the segmental elements 81 and the generally radial walls of the recesses 85. The detents 77 are arranged to engage in shallow recesses 86 formed in certain only of the teeth 74 in the median plane of the element 72. If desired, these recesses 86 may be formed in all of the teeth 74 to simplify assembly of the elements 70 and 72, but this is of course not necessary since these elements may be so assembled that those teeth provided with recesses may overlie the detents 77.

The cooperating members of the synchronizing clutch acting between the gears 15 and 22 and the element 70 are constructed similarly to the corresponding members in the embodiment of the invention hereinbefore described. Thus each of the gears is provided with a laterally directed annulus 88 which is disposed for selective engagement by the adjacent one of two clutch rings 87, these rings being shrunk or otherwise secured in position within the annular elements 83 and being scored or grooved if desired.

It will be observed from Figure 9 that each of the detents 77 is provided adjacent its inner end with a generally conical surface 89 and that each of the coil springs 78 is seated in a recess 91 in the element 70, the outer ends of the recesses 91 being flared to provide surfaces 92 of generally conical shape which are complementary to the surfaces 89. The recesses 91 are so shaped that when the member 72 is slid either to the right or the left from the position in which it is shown in Figure 9, for example, by manipulation of a shifter fork 42 or the like, and the detents 77 are accordingly forced inwardly, these detents may move freely into the recesses 91. However, if the annular elements 83 are displaced circumferentially with respect to the element 70, the detents 77 are retained in their outer position in which they are shown in Figure 9 by reason of the engagement of the conical surfaces 89 and 92. Such circumferential displacement occurs during synchronization prior to positive clutching as the result of the application of torque to the elements 83 by the action of the synchronizing clutch.

In the operation of the device, if it be desired to clutch the gear 15 to the shaft 23, the element 72 is displaced to the left and carries with it the element 70 by reason of the yielding connection between these elements afforded by the detents 77. The clutch ring 87 is thus caused to engage the adjacent annulus 88 and if the shaft 23 and gear 15 are rotating at different speeds, the elements 83 are circumferentially displaced with respect to the element 70. Continued displacement of the element 72 to the left is thus either rendered difficult or entirely prevented by the engagement of the conical detent surfaces 89 with the complementary surfaces 92. As the element 72 and gear 15 approach synchronous rotation, the applied torque which tends to maintain the elements 83 in circumferentially displaced position with respect to the element 70, is gradually decreased. When a condition of approximate synchronism is established, the element 72 may be readily displaced further toward the left, the detents 77 being forced inwardly and into the recesses 91, and proper meshing engagement may thus be effected between the element 72 and the clutch portion 16 of the gear 15. The operation of clutching the gear 22 to the shaft 23 is carried out in the same manner by displacement of the element 72 to the right.

Figure 13 illustrates the application of the invention to a gear train of the so-called slidable gear type, in which two gears are relatively displaced into intermeshing relation for the purpose of establishing the drive or selecting a given ratio. Thus it is here desired to move an annular element 32', having a toothed portion 96, into meshing relation with a gear 97 and to establish prior to the engagement of the toothed elements a relative rotational speed such that the meshing may be effected without difficulty and with a minimum of noise. To this end the annular element 32' is splined to an element 30', which is in turn splined to the shaft 23'. A gear 22' meshes with the gear 97 and is provided with a laterally directed annulus 55 formed to provide a clutch surface with which a complementary clutch surface on the element 30' may engage. The construction and mode of operation are otherwise quite similar to that described in connection with the remaining figures of the drawings, the frictional engagement being established prior to the engagement of the toothed portion 96 of the annulus 32' with the gear 97, so that the latter is brought up to the proper speed by the gear 22' which has the same number of teeth as the toothed portion 96.

It will be appreciated that in its broader aspect the invention contemplates means whereby any two rotatable torque transmitting elements may be positively connected, which means may be freely operated to effect such positive connection only after a condition of approximate synchronism of the two elements has been established.

Having thus described the invention, what is claimed as new and desired to be secured by Letters Patent is:

1. In a motor vehicle transmission having driving and driven members, positive clutch means slidable to connect said members, a friction clutch between said members engageable in advance of the positive clutch means, yielding means connecting said positive clutch means and said friction clutch to effect engagement of the latter during sliding of the former, and means operable on engagement of said friction clutch and prior to the establishment of approximate synchronous movement of said members for retarding further sliding of said positive clutch means in a direction to positively connect said members, said last named means acting on said yielding means.

2. In apparatus of the class described, the combination with coaxial rotating elements, of means including a member displaceable axially for effecting positive coupling between said elements, means including a member displaceable axially for effecting frictional coupling between said elements, a releasable connection between said members including a spring detent, whereby said frictional coupling may be established by axial displacement of said first named member and prior to the establishment of said positive coupling, and means operable by said frictional coupling, effective while said elements are rotating at different speeds, and acting on said detent to oppose release of the latter, whereby establishment of said positive coupling is opposed until said elements are rotating in substantial synchronism.

3. In clutch synchronizing apparatus, the combination with an axially movable positive clutch member, of a friction clutch member, spring detent means releasably coupling said members for initial concurrent axial displacement to render said friction clutch member effective prior to said positive clutch member, and means movable circumferentially with respect to said spring detent means on initial engagement of said friction clutch member for engaging said spring detent means and opposing release thereof until synchronization is effected.

4. In clutch synchronizing apparatus, the combination with an axially movable positive clutch member, of a friction clutch member, spring detent means releasably coupling said members for initial concurrent axial displacement to render said friction clutch member effective prior to said positive clutch member, and means movable circumferentially with respect to said spring detent means on initial engagement of said friction clutch member for opposing release of the coupling between said members until synchronization is effected, said last named means having a cam surface for engagement with a cooperating cam surface on said spring detent means to resist displacement of the latter.

5. In apparatus of the class described, the combination with coaxial rotating elements, of means including a member displaceable axially for effecting positive coupling between said elements, means including a member displaceable axially through a less distance for effecting frictional coupling between said elements, a releasable connection between said members, whereby said members may together be displaced axially to effect frictional coupling between said elements prior to the establishment of positive connection therebetween, and means responsive to differing rotational speeds of said elements and acting on said releasable connection to resist release of the latter.

6. In apparatus of the class described, the combination with coaxial rotating elements, of means including a member displaceable axially for effecting positive coupling between said elements, means including a member displaceable axially through a less distance for effecting frictional coupling between said elements, a releasable connection between said members, whereby said members may together be displaced axially to effect frictional coupling between said elements prior to the establishment of positive connection therebetween, and means operable by said frictional coupling, effective only while said elements are rotating at different speeds, and acting on said releasable coupling to resist release of the latter.

WALTER R. GRISWOLD.